(12) United States Patent
Nemawarkar et al.

(10) Patent No.: US 10,310,975 B2
(45) Date of Patent: *Jun. 4, 2019

(54) CACHE OFFLOAD BASED ON PREDICTIVE POWER PARAMETER

(71) Applicant: Seagate Technology LLC, Cupertino, CA (US)

(72) Inventors: Shashank Nemawarkar, Austin, TX (US); Balakrishnan Sundararaman, Austin, TX (US); Mark Ish, Castro Valley, CA (US); Siddhartha Kumar Panda, Bangalore (IN); Bagavathy Raj Arunachalam, Tamil Nadu (IN)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/152,374

(22) Filed: May 11, 2016

(65) Prior Publication Data

US 2017/0329707 A1  Nov. 16, 2017

(51) Int. Cl.
| | |
|---|---|
| *G06F 11/07* | (2006.01) |
| *G06F 12/0804* | (2016.01) |
| *G06F 3/06* | (2006.01) |
| *G06F 12/0868* | (2016.01) |
| *G06F 11/14* | (2006.01) |
| *G06F 1/32* | (2019.01) |
| *G06F 1/3234* | (2019.01) |
| *G06F 11/20* | (2006.01) |

(52) U.S. Cl.
CPC ........ *G06F 12/0804* (2013.01); *G06F 3/0619* (2013.01); *G06F 3/0647* (2013.01); *G06F 3/0683* (2013.01); *G06F 11/1441* (2013.01); *G06F 12/0868* (2013.01); *G06F 1/32* (2013.01); *G06F 1/3268* (2013.01); *G06F 3/0625* (2013.01); *G06F 11/1446* (2013.01); *G06F 11/2015* (2013.01); *G06F 2212/1032* (2013.01); *G06F 2212/281* (2013.01); *G06F 2212/313* (2013.01); *G06F 2212/7208* (2013.01)

(58) Field of Classification Search
CPC ....... G11C 5/141; G11C 5/148; G06F 3/0647; G06F 3/0619; G06F 3/0614; G06F 1/30; G06F 1/3287; G06F 3/0625; G06F 1/32; G06F 1/3268

See application file for complete search history.

(56) References Cited

U.S. PATENT DOCUMENTS

| 5,117,324 A * | 5/1992 | Johnson, Jr. ............. G06F 1/30 307/66 |
|---|---|---|
| 6,195,754 B1 | 2/2001 | Jardine et al. |
| 6,725,397 B1 | 4/2004 | Emberty et al. |
| 7,100,080 B2 | 8/2006 | Howe |

(Continued)

*Primary Examiner* — Joseph O Schell
(74) *Attorney, Agent, or Firm* — Holzer Patel Drennan

(57) ABSTRACT

The disclosed technology provides for selection of a subset of available non-volatile memory devices in an array to receive a dirty cache data of a volatile cache responsive to detection of a power failure. In one implementation, the selection of the non-volatile memory devices is based on one or more predictive power parameters usable to estimate a time remaining during which a reserve power supply can support a cache offload to the selected subset of devices.

19 Claims, 4 Drawing Sheets

(56) References Cited

U.S. PATENT DOCUMENTS

| | | | |
|---|---|---|---|
| 7,293,133 B1* | 11/2007 | Colgrove | G06F 3/0608 |
| | | | 711/111 |
| 8,261,012 B2 | 9/2012 | Kan | |
| 9,286,203 B2* | 3/2016 | Abraham | G06F 9/00 |
| 2006/0212644 A1 | 9/2006 | Acton et al. | |
| 2010/0180065 A1 | 7/2010 | Cherian et al. | |
| 2010/0202237 A1 | 8/2010 | Moshayedi et al. | |
| 2010/0332896 A1* | 12/2010 | Wilson | G06F 1/30 |
| | | | 714/14 |
| 2011/0197036 A1 | 8/2011 | Ishii | |
| 2011/0252180 A1* | 10/2011 | Hendry | G06F 1/3203 |
| | | | 711/3 |
| 2012/0317355 A1* | 12/2012 | Ishizaki | G06F 3/0607 |
| | | | 711/114 |
| 2013/0254457 A1 | 9/2013 | Mukker et al. | |
| 2015/0006815 A1 | 1/2015 | Madhusudana et al. | |
| 2016/0071609 A1* | 3/2016 | Lucas | G11C 16/30 |
| | | | 365/185.18 |
| 2017/0060442 A1* | 3/2017 | Dunn | G06F 3/0608 |

* cited by examiner

CACHE OFFLOAD BASED ON PREDICTIVE POWER PARAMETER

CROSS-REFERENCE TO RELATED APPLICATIONS

This present application is related to U.S. patent application Ser. No. 15/152,295, entitled "Volatile Cache Reconstruction After Power Failure," and filed concurrently herewith, which is specifically incorporated by reference herein for all that it discloses and teaches.

BACKGROUND

Storage devices may use a data cache to store certain types of data (e.g., frequently accessed and/or recently accessed data) and to reduce a total number of data storage reads and/or writes to a main storage area. Although different types of storage media support cache storage regions, some storage devices store cache data on a volatile memory (e.g., DRAM, SRAM) because volatile memory can, in general, be accessed more quickly than non-volatile memory. However, one drawback to volatile memory is that data cannot be maintained within the volatile memory if power is lost. Therefore, many existing devices with volatile data cache regions are unable to ensure full data recovery responsive to unexpected power-loss scenarios.

SUMMARY

One implementation of the disclosed technology provides a storage system that includes at least two non-volatile memory devices, a volatile memory that stores cache data, and a storage device controller communicatively coupled to the volatile memory and the non-volatile memory devices. The storage device controller is configured to detect a power failure of the storage system and select a subset of the non-volatile memory devices to receive the cache data in a cache offload operation responsive to the detection of the power failure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
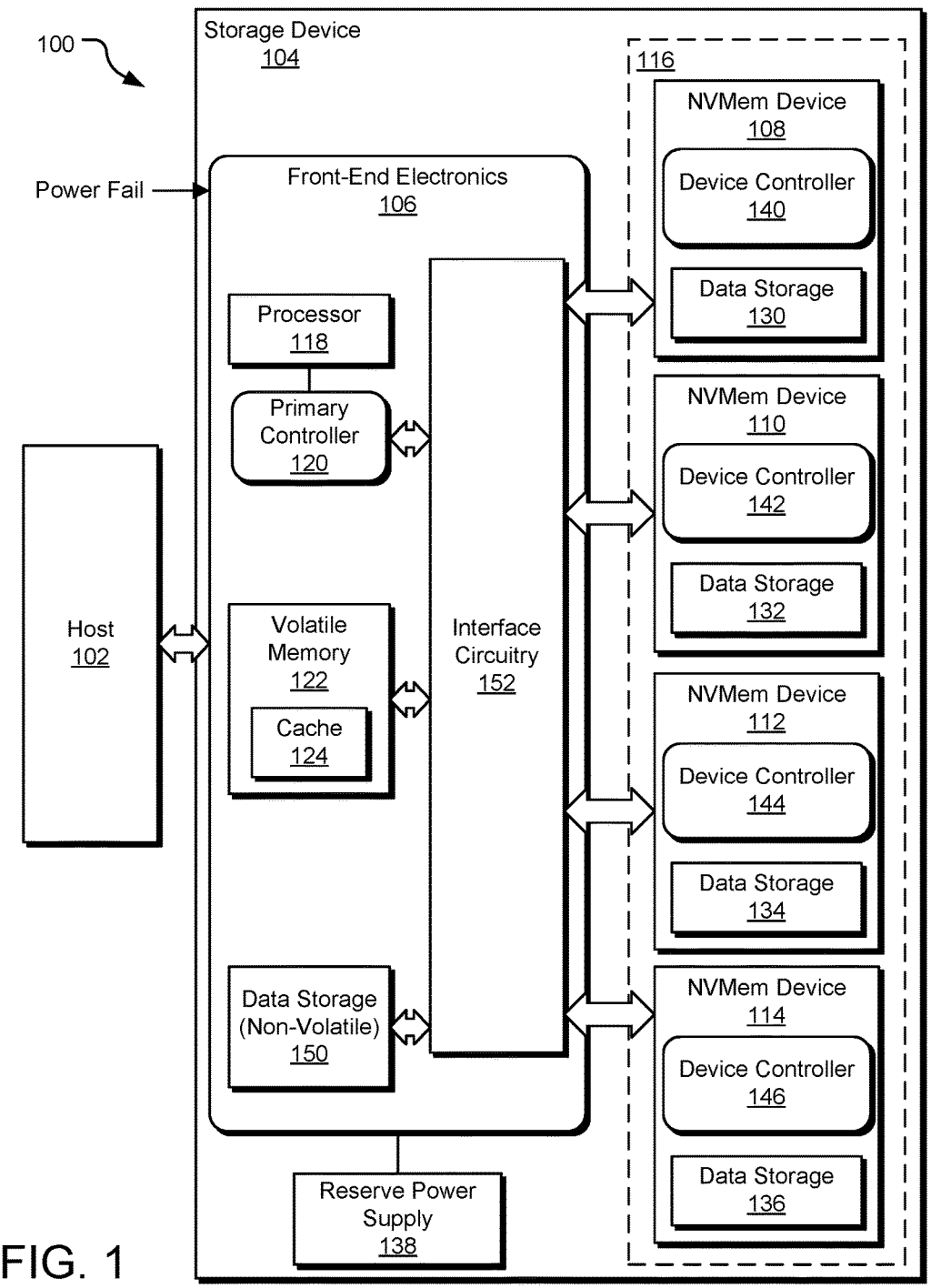
FIG. 1 illustrates an example data storage system that implements a cache offload process to preserve data of a volatile cache in an unexpected power failure scenario.

FIG. 1 illustrates an example data storage system 100 that implements a cache offload process to preserve data of a volatile cache in an unexpected power failure scenario. The data storage system 100 includes a host device 102 that sends access commands (e.g., read, write, and erase commands) to a storage device 104 further including front-end electronics 106 and an array 116 of non-volatile memory device 108, 110, 112, and 114.

Among other components, the front-end electronics 106 includes a primary controller 120 and a processor 118 to execute the primary controller 120 to receive and processes data access commands from the host device 102. In one implementation, the primary controller 120 processes data access commands according to a self-managed mapping scheme that maps host logical block addresses (LBAs) to physical data storage space within the various non-volatile memory devices 108, 110, 112, and 114 of the array 116. In some implementations, the host device 102 does not have access to information regarding how storage space is distributed within the storage device 104. For example, the host device 102 may have access to a total storage capacity of the storage device 104, but lacks access to information such as how many volatile and/or non-volatile storage devices are included in the array 116 or how the total storage capacity is divided between such devices.

The front end electronics 106 further include volatile memory 122 (e.g., DRAM, SRAM) for implementing a cache 124 that temporarily stores data written to and/or read from the storage device 104 by the host device 102. Interface circuitry 152 generates control signals that enable the primary controller 120 to communicate with the volatile memory 122 and with the non-volatile memory devices 108, 110, 112, and 114. The interface circuitry 152 also includes suitable state machine circuitry for accessing the write cache 124 in the volatile memory 122 during execution of access commands from the host device 102 and for subsequently transferring such data to one or more of the non-volatile memory devices 108, 110, 112, and 114.

Each of the non-volatile memory devices 108, 110, 112, and 114 individually includes data storage (e.g., data storage regions 130, 132, 134, and 136) and an associated device controller (e.g., device controllers 140, 142, 144, and 146) for executing data access commands directed to associated data storage region. Although the non-volatile memory device 108 is shown to be in a same physical enclosure as the front-end electronics 106, the non-volatile memory device 108 is, in some implementations, physically separated from (e.g., remote from) the front-end electronics 106. In different implementations, the non-volatile memory devices may take on a variety of forms including without limitation magnetic storage disks, solid state drives, flash memory optical storage disks, read only memories (RAMs), and the like. In one implementation, the non-volatile memory devices 108, 110, 112, and 114 include NAND or NOR flash and a flash controller. Although the array 116 is shown to include four non-volatile memory devices, the array 116 may, in other implementations, include a greater or fewer number of non-volatile memory devices.

In one implementation, the primary controller 120 executes a write command from the host device 102 by initially writing incoming data to the cache 124 instead of to the corresponding physical storage space corresponding to a target logical block address (LBA) that the host device 102 specifies along with the write command. Subsequently, such as during idle time and/or a background process of the storage device 104, the primary controller 120 offloads data in the cache 124 to target physical locations in the non-volatile memory array 116 corresponding to the associated host LBA(s) by a mapping scheme of the primary controller 120. Data written to the volatile memory 122 and awaiting transfer to a more permanent location is referred to as "dirty," a term of art indicating that the data is yet to be stored permanently within the non-volatile storage. If a power outage occurs, dirty data can be lost if additional data protection measures are not implemented.

In one implementation, the primary controller 120 sends an acknowledgement to the host device 102 responsive to each data write to the cache 124, acknowledging the data write as if the write were successfully executed to a non-volatile memory region. This false acknowledgement can mitigate associated write latencies, allowing the host device 102 to continue with normal operations rather than wait for a lengthy data write and acknowledgment to and from the non-volatile memory array. However, this false acknowledgment also leaves data in the cache 124 vulnerable in the event of an unexpected power failure. As used herein, "unexpected power loss" refers to a power loss that occurs in a non-routine manner. When an unexpected power loss occurs, the storage device 104 may not execute usual shut-down procedures that ensure data integrity. An unexpected power loss may occur, for example, when a user pulls a power plug, when battery life of the storage device 104 expires, or when a connection between the host device 102 or a power supply and the storage device is suddenly severed or altered.

To address the foregoing, the primary controller 120 self-implements a data preservation scheme that draws power from a reserve power supply 138 to offload dirty data of the cache 124 to one or more devices of the non-volatile memory array 116. During a cache offload, dirty data may be moved to non-volatile storage locations other than the corresponding host-specified target LBA locations. For example, the cache offload may move dirty data to a region of the data storage 130 in non-volatile memory device 108 that is specifically designated for dirty data that has not yet been written to its corresponding LBA location (e.g., the original, target LBA locations of the data).

The reserve power supply 138 is a different power source than a primary power source, such as that provided by a connection to the host device 102, and may generally include one or more batteries, capacitors, or a back EMF (electromotive force) sufficient to power the cache 124, relevant portions of the primary controller 120, and selected devices of the non-volatile memory array 116 for a period of time sufficient to facilitate a transfer of all or a select portion of dirty data in the cache 124 to one or more selected devices of the non-volatile memory array 116.

Responsive to detecting an unexpected power loss, the primary controller 120 executes one or more commands to halt all current storage operations and powers down or off any front-end electronics that are not needed to execute a cache offload. The primary controller 120 then assesses an amount of dirty data residing in the cache 124 and dynamically selects one or more devices of the non-volatile storage array 116 to receive all or a portion of the dirty data. For example, the primary controller 120 may elect to offload the dirty data to a single one of the non-volatile memory devices 108, 110, 112, and 114. Alternatively, the primary controller 120 may elect to divide the dirty data between two or more of the non-volatile memory devices 108, 110, 112, and 114. After selecting a subset of the non-volatile memory devices 108, 110, 112, and 114 to receive the dirty data, the primary controller 120 powers down or off any devices in the non-volatile memory array 116 that are not selected to receive all or a portion of the dirty data, and performs the cache offload while supplying power to a bare minimum number of essential components and devices.

In some situations, it may be advantageous to store all dirty cache data in a single non-volatile memory device. For example, it may be easier to restore the cache 124 after a power failure if the offloaded dirty data is saved in a single one of the non-volatile memory devices 108, 110, 112, or 114, such as according to an unaltered arrangement of the dirty data (e.g., a preserved cache image). In other implementations, it may be desirable to divide dirty cache data to different non-volatile memory devices, such as based on data type (e.g., executable file, user document, etc.).

One goal in selecting the non-volatile devices of the array 116 for the cache offload is to select the non-volatile memory devices in a manner so as to ensure that all or a predetermined portion of dirty data in the cache can be transferred to into the non-volatile memory devices before the reserve power supply 138 is exhausted. A number of factors affect this outcome including, for example, the available charge in the reserve power supply 138, the total bandwidth of the various receiving devices in the array 116, the size of data transferred by each data transfer command, and the electrical current demands on the reserve power supply 138 from various devices components that remain powered throughout the duration the cache offload.

In general, it may take a longer period of time to offload all the dirty data to a single non-volatile memory device than to divide the data between two or more such devices. This is due to the fact that a total rate of data transfer (total bits/sec) increases when more devices are simultaneously utilized to receive data during the cache offload. However, these gains in offload speed may be somewhat offset by increased power draw on the reserve power supply 138, as powering multiple non-volatile memory devices of the array 116 draws a larger net current from the reserve power supply 138 than the net current drawn to power a single non-volatile memory device of the array 116. Another factor influencing reserve charge depletion is the amount of power drawn by the front-end electronics 106 for the duration of the offload. If the total offload time is shorter, as when dirty data is divided between multiple non-volatile devices in the array 116, the front-end electronics 106 do not have to be powered for as long as in situations where the dirty data is offloaded to a single one of the non-volatile memory devices in the array 116. Therefore, the front-end electronics 106 may draw less of the reserve charge when data is offloaded to a greater number of non-volatile memory devices than when data is offloaded to a smaller number of non-volatile memory devices.

The primary controller 120 implements an intelligent data preservation scheme that takes into account these and/or other predictive power parameters to dynamically select the non-volatile memory devices in the array 116 for receiving the offloaded cache data. Consistent with those examples provided above, "predictive power parameters" refers to any system parameters that affect a rate of power consumption in a given cache offload scenario. One example predictive power parameter is a bandwidth, or rate that data can be transferred, from the cache 124 to each of the non-volatile memory devices in the array 116. In some implementations, the non-volatile memory devices in the array 116 are identical and have identical bandwidth. In other implementations, the different non-volatile memory devices in the array 116 may have different bandwidth. In one implementation, the primary controller 120 accesses bandwidth specifications of one or more of the non-volatile devices in the array 116 to compute or otherwise determine a "time to cache offload completion." For example, bandwidth specifications may be stored in a non-volatile data storage 150 of the front-end electronics 106, such as an on-chip flash device.

Another example predictive power parameter is "current draw," or a magnitude of current that is drawn, such as by the front-end electronics 106 and by each of the non-volatile memory devices 108, 110, 112, and 114. Once a primary power source (e.g., connection to host device 102) becomes unavailable, the front-end electronics 106 and non-volatile memory devices 108, 110, 112, and 114 each draw current from the reserve power supply 138. The relative amounts of current drawn by each of the non-volatile memory device 108, 110, 112, and 114 and the front-end electronics 106 may be the same or different based on specific storage device characteristics that may vary from one implementation to another. In one implementation, the primary controller 120 access one or more stored time/charge profiles of the non-volatile memory devices in the array 116 to determine a "time to reserve charge depletion." Various time/charge profiles may be stored in non-volatile memory accessible to the primary controller 120, such as the non-volatile data storage 150 of the front-end electronics 106.

Still another example predictive power parameter is size of each individual data transfer that occurs during a cache offload. In one implementation, cache offload commands (e.g., commands executed responsive to power loss) transfer dirty data according to a different data structure than a data structure that is used to transfer dirty data during a normal cache flush. In contrast to a cache offload that is performed responsive to a power failure, a normal cache flush is, for example, a routine flush of the cache employed to move dirty data to non-volatile storage locations that correspond to host-specified target LBA locations.

In one implementation, data is moved in smaller "chunks" during a normal cache flush than in a cache offload. For example, a normal cache flush may entail segmenting dirty data into 4 kb-64 kb chunks and individually moving each chunk to a non-volatile memory location with a separate data transfer command. In contrast, a cache offload may entail segmenting dirty data into much larger chunks, such as 1-5 MB chunks, and individually moving each data chunk to a non-volatile storage location with a separate data transfer command. Consequently, a cache offload may be implemented with fewer total data transfer commands and in a shorter period of time than a normal cache flush. In some implementations, the size of data chunks selected for a cache offload is generally uniform for all of the dirty data. In other implementations, the data chunks are of variable size.

Responsive to detection of an unexpected power failure, primary controller 120 uses performance factors to select the data chunk size for a cache offload, such as factors relating to current drive performance and power performance. For example, larger chunks may utilize more power but offload more quickly. For this reason, an optimal data chunk size depends on bandwidth and current drawn by each non-volatile memory device as well as combinations of such devices receiving the dirty data in the cache offload.

In some implementations, a data chunk size for a cache offload is selected based on a same model utilized in selecting the subset of non-volatile memory devices 108, 110, 112, and 114 to receive dirty data during the cache offload. For example, the primary controller 120 may access time/charge profiles indicating charge depletion according to different offload scenarios, where each scenario is itself modeled on a different chunk size and/or a different subset of devices with unique or similar bandwidth and/or current draw specifications. In some implementations, the cache 124 may be restored from the non-volatile memory device following a restoration of power via a process that moves the same chunks of data back into the cache 124 in the order that the chunks were transferred from the cache 124 during the cache offload.

Physical power connections are another example predictive power parameter. For example, in some systems, two or more of the non-volatile memory devices in the array 116 may be powered by a shared power switch (and thus either jointly in an "on" state or jointly in "off" state). In this case, the primary controller 120 may consider cache offload scenarios under which the jointly powered devices are either jointly "on" or jointly "off." In one implementation, the primary controller 120 accesses a mapping of physical power connections and/or other physical mapping to compute or determine a "time to reserve charge completion." A power map may be stored in any accessible non-volatile memory location, such as the non-volatile data storage 150 of the front-end electronics 106.

By dynamically selecting the non-volatile memory devices of the array 116 to receive dirty data from the cache 124 in each individual power-loss scenario, the primary controller 120 can ensure that all or a predetermined amount of the dirty cache data is preserved. Notably, there may, in some implementations, be instances where the amount of dirty data in the cache 124 is so large that the reserve charge in the reserve power supply 138 is insufficient to offload all of the dirty data. In such instances, the primary controller 120 may restrict the offload to a select subset of the dirty data that can be transferred the reserve charge. For example, the primary controller 120 may selectively implement rules prioritizing which types of data are to be offloaded and which types of data are to be discarded. In one implementation, the primary controller 120 excludes certain data structures of the dirty data from the cache offload, such as those that can be easily reconstructed.

Figure 2:
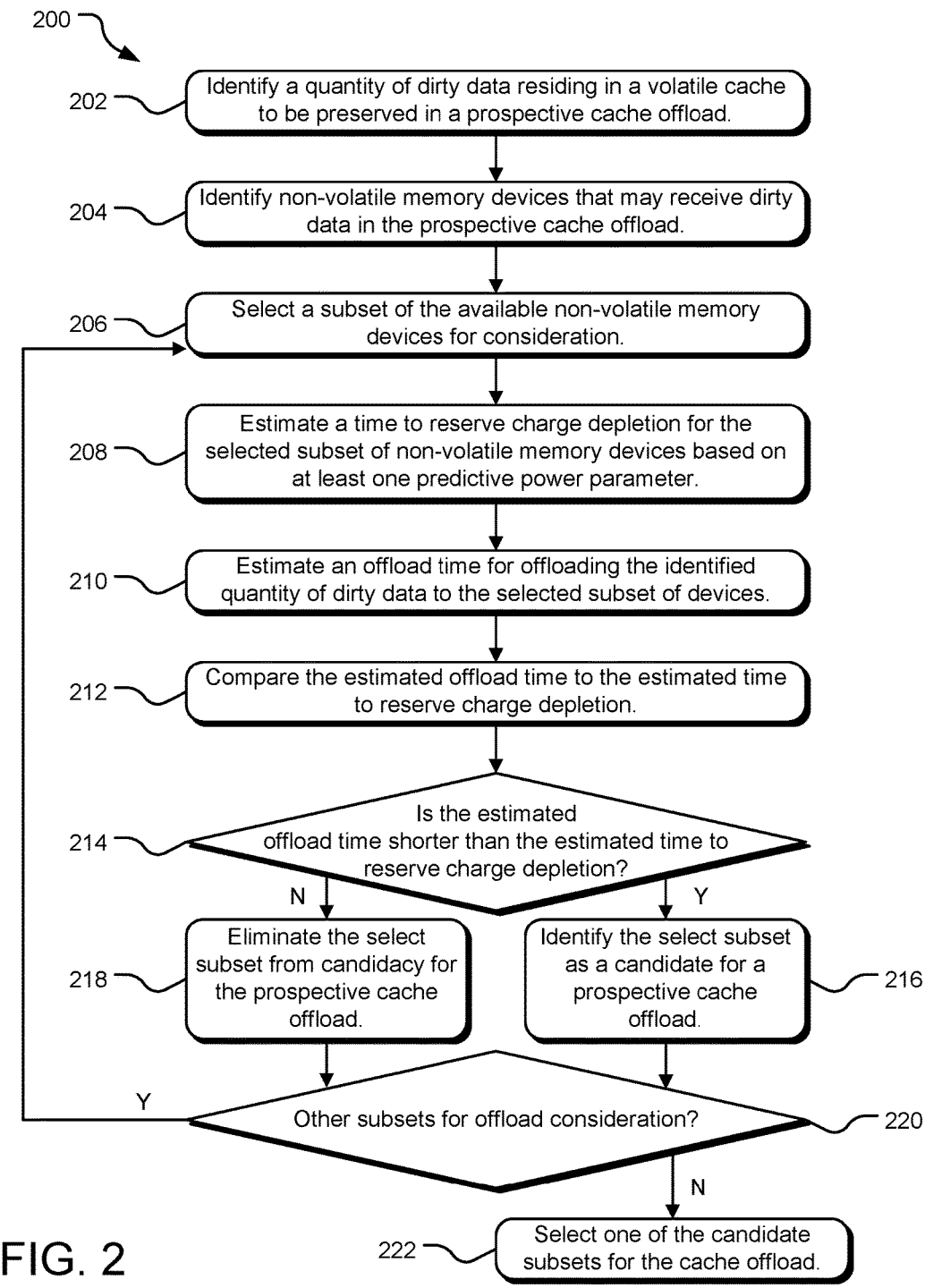
FIG. 2 illustrates example operations for selecting a subset of non-volatile memory devices to receive data in a prospective cache offload for a data storage device.

FIG. 2 illustrates example operations 200 for selecting a subset of non-volatile memory devices that may receive data in a prospective cache offload for a data storage device. The data storage device includes at least a volatile cache and front-end controller (e.g., the primary controller 120 in FIG. 1) capable of transferring data from the volatile cache to various non-volatile memory devices in a back-end array. For example, each non-volatile memory device in the back-end array may include its own device controller that is communicatively coupled to the front-end controller of the data storage device.

In one implementation, the operations 200 are performed responsive to initial detection of an unexpected power failure. For example, the front-end controller may detect the power failure and perform one or more power preservation actions, such as switching to a reserve power source, halting normal data storage operations, and/or shutting down various front-end electronics not needed to execute a cache offload. For example, the front-end controller may shut down portions of the data storage device that interface with a host device and play no role in the offloading of dirty data from a volatile memory.

An identification operation 202 identifies a quantity of dirty data currently residing in a volatile cache that is to be preserved in a prospective cache offload. Another identification operation 204 identifies communicatively-coupled non-volatile memory devices that are available to receive at least some of the dirty data in the prospective cache offload. A selection operation 206 selects a subset of the available of non-volatile memory devices for assessing viability of the prospective cache offload (e.g., in a series of assessment operations 208-218).

An estimation operation 208 estimates (e.g., calculates or looks-up) a time to reserve charge depletion for the selected subset of non-volatile memory devices based on at least one predictive power parameter. In general, the time to reserve charge depletion estimates a time period during which a reserve power supply can support an offload of dirty data before shutting down or malfunctioning. For example, the estimation operation 208 may access power parameters specific to each device of the selected subset to determine a net current draw on the reserve power supply and with this information, calculate the estimated time to reserve charge depletion.

In one implementation, the estimation operation 208 is performed by retrieving a time/charge profile that indicates predicted rate(s) of reserve charge depletion over a time period during which the select subset of devices are powered for the prospective cache offload. In one implementation, the time/charge profile is originally generated based on an assumption that certain device components are powered off for all or a portion of the time period, such as front-end electronics that do not play a role in the prospective cache offload.

If, for example, the selected subset of devices includes a single non-volatile memory device, the retrieved time/charge profile may indicate a depletion of reserve charge over time attributable to power demands of the single device and front-end electronics (e.g., primary controller, volatile cache) that play a role in offloading the dirty cache data to the single non-volatile memory device. If, alternatively, the selected subset of devices includes two or more non-volatile memory devices, the retrieved time/charge profile may indicate a rate of charge depletion attributable to power demands of each of the devices in the selected subset as well as any front-end electronics that play a role in offloading the dirty cache data to the selected subset of devices.

The retrieved time/charge profile may associate a critical reserve charge level with a future point in time (as further illustrated and described with respect to FIG. 4, below). The critical reserve charge level is, for example, a minimum level of charge below which the data storage device cannot properly operate to transfer data between a volatile memory location and any or all of the non-volatile memory devices in the selected subset.

In various implementations, the time/charge profiles may be retrieved from memory and/or dynamically generated. For example, a retrieved time/charge profile for a subset including three non-volatile memory devices may indicate that the three memory devices can be simultaneously powered for approximately 7 seconds before reaching the critical reserve charge level; another retrieved time/charge profile for a subset including two non-volatile memory devices may indicate that the two non-volatile memory devices can be simultaneously powered for approximately 10 seconds before reaching the critical charge level; and a third retrieved time/charge profile for a subset including one non-volatile memory device may indicate that the single non-volatile memory device can be powered be powered for 13 seconds before reach the critical charge level. In some implementations, each stored time/charge profile may also be based on an assumed "chunk size" of dirty data, where a "chunk" represents a portion of dirty data transferred and stored in a contiguous storage location via a single data transfer command. When the chunk size is large, a set amount of dirty data may be transferred more quickly but at the cost of increased power as compared to a smaller chunk size. Since optimal data chunk size may depend on drive performance factors unique to each individual non-volatile memory device, some time/charge profiles may associate a different data chunk size with different receiving devices.

In one implementation, the storage device stores time/charge profiles in association with each of the subsets of the non-volatile memory devices identified by the identification operation 204. In another implementation, time/charge profiles are stored in association with the subsets of devices that can be independently powered. If, for example, two or more of the non-volatile memory devices share a same power switch, those devices may be considered jointly (e.g., either both off or both on in any given time/charge profile scenario). Time/charge profiles may further be associated with a specific amount of 'starting' reserve charge. For example, the front-end controller may detect the amount of charge currently available in a reserve power supply and retrieve time/charge profiles associated with that amount of charge. The time/charge profiles may also anticipate and account for the intentional, future shut-off (power down) of one or more device components within the time period before the critical charge level is reached, such as at points in time when those devices cease to play a role in the cache offload.

Another estimation operation 210 estimates (e.g., calculates or looks up) an offload time for offloading the identified quantity of dirty data to the devices of the selected subset. In one implementation, this estimation is based on an assumption that the dirty data is to be equally apportioned between the different devices in the selected subset and simultaneously offloaded to each of the devices. If, for example, the selected subset includes two devices, the estimation operation 210 may estimate the offload time based on an assumption that half of the dirty data is offloaded to a first device and half of the dirty data is offloaded to a second device.

In another implementation, the estimation operation 210 estimates the offload time based on an assumption that all devices of the selected subset are offloading data for an approximately equal time period. If, for example, the different devices receive data at different bandwidths, a high-bandwidth device may receive more data than a low-bandwidth device over an equal period of time. In still other implementations, the estimation operation 210 estimates the offload time for the selected subset of devices based on additional considerations. For example, data may be split up and stored on different devices of the selected subset based on one or more considerations such as data type, redundancies associated with each device in the subset, known operating defects of particular devices, etc.

A comparison operation 212 compares the estimated offload time for the select subset to the estimated charge depletion time for the selected subset, and a determination operation 214 determines whether the estimated offload time is shorter than the estimated charge depletion time. If the estimated offload time is shorter than the estimated charge depletion time for the selected subset, an identification operation 216 identifies the select subset as a potential candidate for data receipt in a prospective offload of the dirty cache data. If, on the other hand, the estimated offload time is longer than the estimated charge depletion time for the given offload scenario, an elimination operation 218 eliminates the select subset of devices from candidacy for the prospective cache offload. In either case, a determination operation 220 determines whether there exist other subsets of non-volatile memory devices to consider for the prospective cache offload. If there are other subsets to consider, the operations 206 through 220 are repeated for each additional subset.

When the determination operation 220 determines that each of the identified subsets of non-volatile devices has been either eliminated (via operation 218) or identified (via operation 216) for the prospective cache offload, a selection operation 224 selects one of the subsets identified via the identification operation 216 for the cache offload. A variety of considerations may affect the selection operation 224 including, for example, a relative ease of cache image restoration following the power-down sequence and known potential performance factors or risks relating to each of the non-volatile memory devices.

In some implementations, the selection operation 224 selects, when possible, to offload all of the dirty data to a single non-volatile storage device. For example, the operations 202-220 may indicate that the reserve charge can support a first offload scenario whereby the dirty data is offloaded to a single non-volatile memory device or a second offload scenario whereby the direct data is divided into two portions and each portion is offloaded to a different non-volatile memory device. Selecting the first offload scenario in this case may simplify operations for restoring a cache image following the unexpected power loss and a restoration of power.

In other implementations, the storage device may opt to execute the cache offload to two or more non-volatile memory devices, such as by dividing the dirty data into multiple portions and transferring a different portion of the data to each device in the selected subset. In one implementation, the selection operation 224 selects the candidate subset including the least number of non-volatile memory devices as a default rule. In other implementations, the selection operation 224 selects a candidate subset including two or more devices. This option may facilitate an offload of different data types to different devices. A variety of other considerations may also or alternatively influence the selection operation 224.

In the event that no suitable offload candidates are identified, the front-end controller of the storage device may identify a smaller portion of the dirty data (less than all of the dirty data) to consider for the prospective cache offload. For example, reproducible data structures may be excluded from the quantity of data identified in the identification operation 202 and the estimated offload time may be re-calculated at 210 based on this reduced quantity of dirty data.

Figure 3:
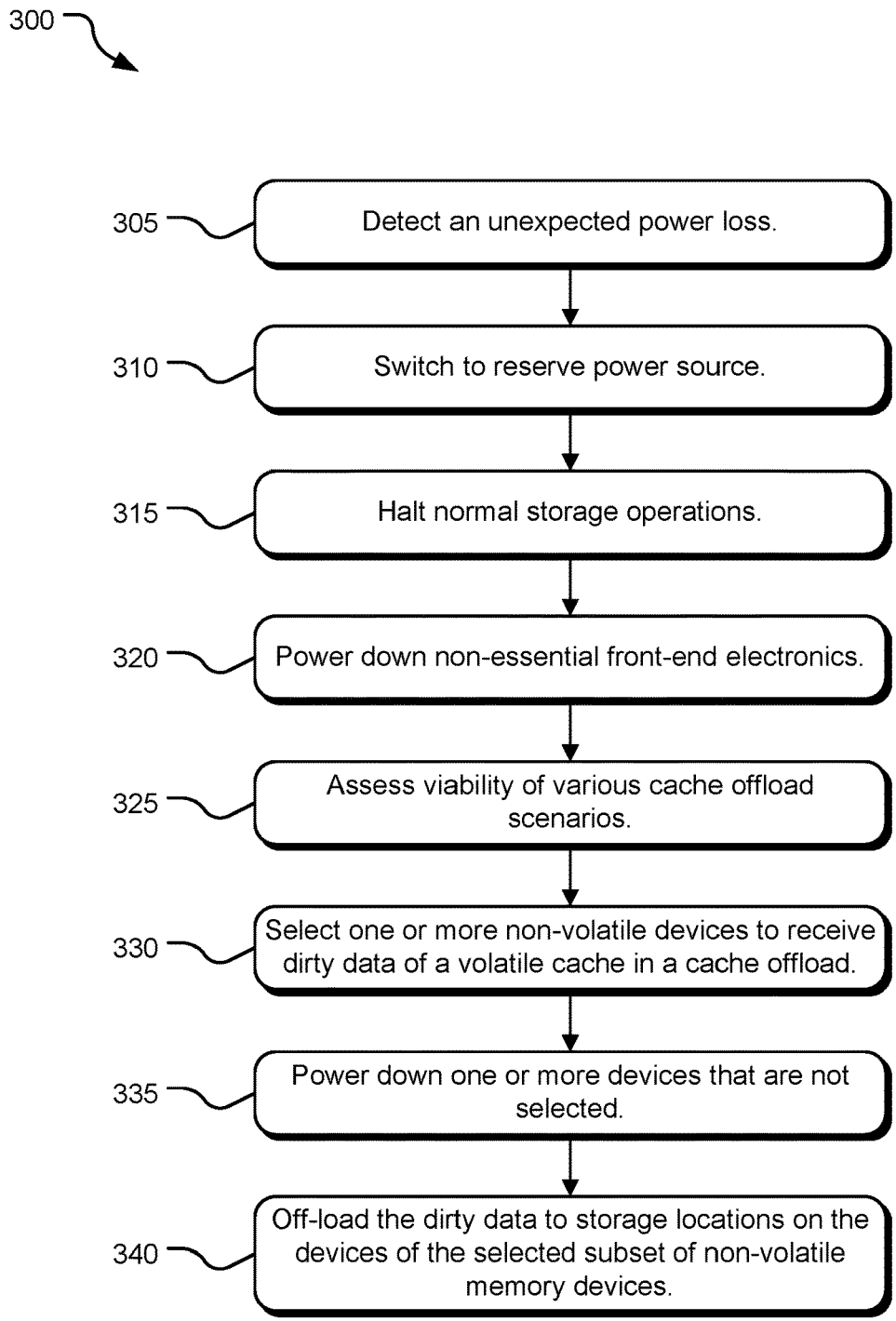
FIG. 3 illustrates example operations for offloading data from a write cache in volatile memory to a selected subset of non-volatile memory devices.

FIG. 3 illustrates example operations 300 for offloading dirty data from a write cache in volatile memory to a selected subset of non-volatile memory devices. A detection operation 305 first detects an unexpected power loss. A power source switching operation 310 switches a power supply from a failed power source to a reserve power source. In one implementation, the failed power source is an electrical connection to a host device. The reserve power source may be provided by, for example, batteries, one or more capacitors, etc. After switching to the reserve power source, a halting operation 315 halts all normal storage operations of a storage device. A partial power down operation 320 shuts down portions of the storage device that are not needed to preserve dirty data, such front-end electronics that interface with a host device.

An assessment operation 325 assesses viability of multiple offload scenarios. In one implementation, each of the different offload scenarios entails offloading dirty cache data a different subsets of non-volatile memory devices. For example, the assessment operation 325 may assess whether the cache data can be successfully offloaded in each different offload scenario to select non-volatile devices before the reserve power source reaches a critical charge level. The assessment operation 325 may be based on a variety of predictive performance parameters including without limitation: bandwidth of each non-volatile memory device, current drawn by each individual non-volatile memory device, a size of dirty data "chunks" transferred by each individual data transfer command, physical power connections, etc. In one implementation, the assessment operation 325 entails performing operations 200 shown and described above with respect to FIG. 2.

Based on this assessment operation 325, a selection operation 330 selects one or more devices of a non-volatile memory array to receive all or a portion of the dirty data. For example, the selection operation 330 may elect to send some of the dirty data to a first subset of the non-volatile memory device and another subset of the dirty data to a second non-volatile memory device.

A power down operation 335 powers down any devices of the non-volatile memory array that are not selected by the selection operation 330. A cache offload operation 340 offloads dirty data from the volatile cache to device(s) of the non-volatile memory array selected during the selection operation 330.

Figure 4:
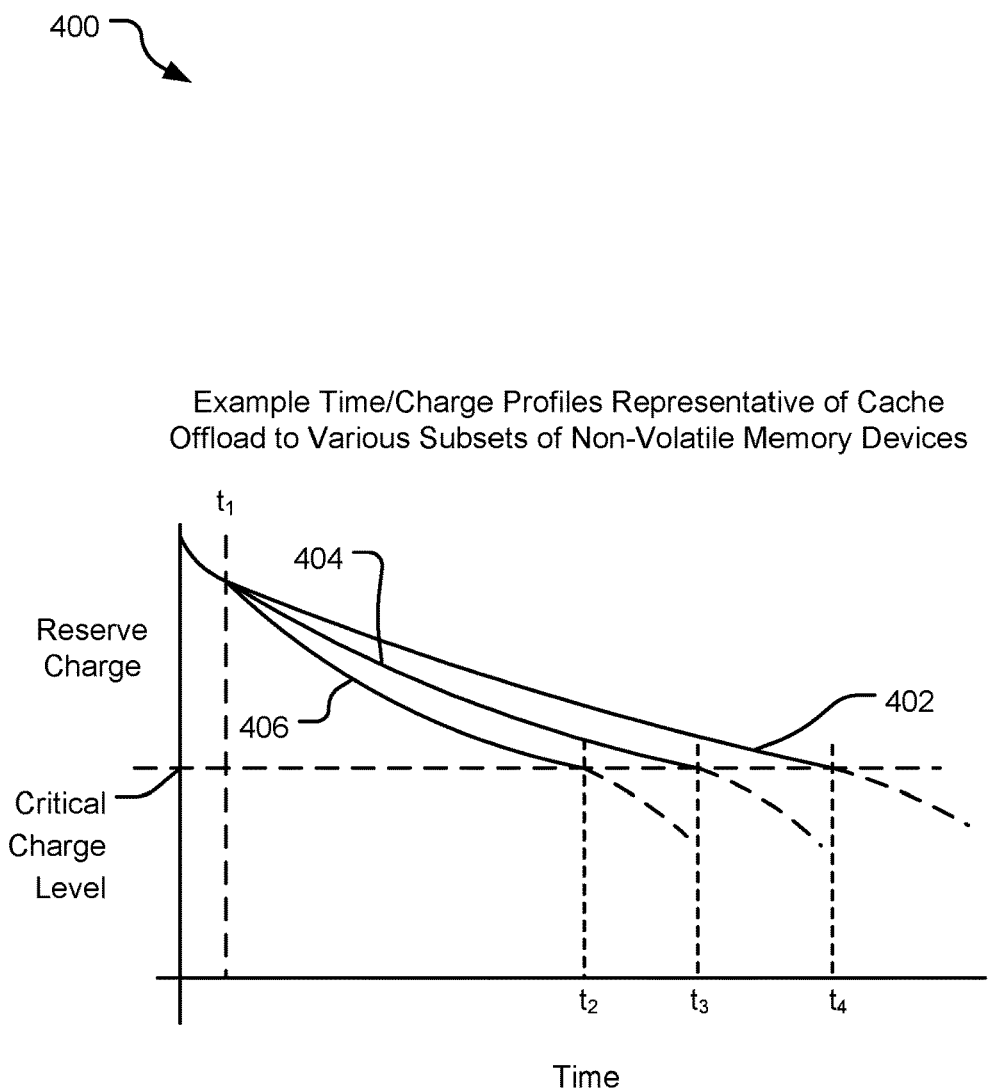
FIG. 4 illustrates a graph including example time/charge profiles each indicating a predicted rate of reserve charge depletion according to a different cache offload scenario for a data storage device.

FIG. 4 illustrates a graph 400 including three example time/charge profiles 402, 404, and 406, each indicating a predicted rate of charge depletion according to a different cache offload scenario for a data storage device. For example, the data storage device may include a volatile cache and an array of non-volatile memory devices A, B, and C that may each be selected to receive some or all data of the volatile cache in the event of a power failure. The time/charge profiles 402, 404, and 406 are merely exemplary and may, in operation, be drive-dependent and differ dramatically in appearance for different representative devices.

In FIG. 4, the vertical axis indicates a quantity of charge available in a reserve power supply. This charge depletes with time, as indicated by values along the horizontal axis. The first time/charge profile 402 represents an offload scenario that entails supplying power to a single one of the non-volatile memory devices (e.g., a device A) during a prospective cache offload; the second time/charge profile 404 represents an offload scenario that entails supplying power to exactly two non-volatile memory devices (e.g., devices A and B) during the prospective cache offload; and the third time/charge profile 406 represents an offload scenario that entails supplying power to three non-volatile memory devices (e.g., devices A, B, and C) during the prospective cache offload.

Each of the offload scenarios represented by the time/charge profiles 402, 404, and 406 is individually associated with an assumed "chunk size" or segment of dirty data offloaded by separate cache offload commands. For example, the time/charge profiles 402, 404, and 406 may all be based on assumption that the chunk size is 1 MB. Another set of time/charge profiles (not shown) may therefore be based on an assumption that the chunk size is 2 MB. Further, some time/charge profiles may individually associate a different chunk size with different non-volatile memory devices.

Each of the offload scenarios represented by the time/charge profiles 402, 404, and 406 is further generated based on the assumption that devices not used in the cache offload can be powered down prior to the cache offload. If, for example, the storage device includes back-end non-volatile memory devices A, B, and C, the first time/charge profile 402 presumes that devices B and C are powered down and the second time/charge profile 404 presumes that the device C is powered down.

The time/charge profiles 402, 404, and 406 each associate a critical reserve charge level (e.g., 'critical charge') with a future point in time (e.g., t2, t3, and t4). The critical reserve charge level is, for example, a minimum level of charge below which the data storage device cannot properly operate to transfer data between a volatile memory location and the non-volatile memory devices. The times t2, t3, and t4 therefore represent an estimated time of charge depletion (as described above with respect to FIG. 2) for each of the three represented offload scenarios. Another time 't1' indicates a time when some electronics are powered off, such as any non-volatile memory devices not receiving data in the cache offload of each of the three offload scenarios.

A unique estimated offload time can also be calculated for each of the offload scenarios represented by the time/charge profiles 402, 404, 406. In one exemplary implementation, each of the devices A, B, and C is of equal bandwidth and the various offload scenarios entail equally proportioning the dirty data for simultaneous offloads to the selected devices in each subset. For example, the offload scenario corresponding to 406 entails simultaneously offloading approximately ⅓ of the dirty data to device A, another ⅓ of the dirty data to a device B, and another ⅓ of the dirty data to device C. Likewise, the example offload scenario corresponding to 404 entails simultaneously offloading data to devices A and B, so that each device receives an approximately equal amount of data.

As indicated by the graph 400, the estimated offload time associated with the time/charge profile 406 is the shortest; an estimated offload time associated with the time/charge profile 404 is the second shortest; and an estimated offload time associated with the time/charge profile 402 is the longest. Provided that the estimated time of charge depletion (t2, t3, and t4) for each given scenario exceeds the corresponding estimated offload time, the offload scenario may be considered a viable candidate for the prospective offload.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage system comprising:
   at least two non-volatile memory devices;
   a volatile memory that stores cache data; and
   a storage device controller communicatively coupled to the volatile memory and the non-volatile memory devices, the controller configured to detect a power failure of the storage system and select a subset of the non-volatile memory devices to receive the cache data in a cache offload operation responsive to the detection of the power failure, the subset of the non-volatile memory devices being selected based on at least one predictive power parameter.

2. The storage system of claim 1, wherein the at least one predictive power parameter includes bandwidth and current drawn.

3. The storage system of claim 1, wherein the selection of the subset of the non-volatile memory devices is further based on a comparison between a predicted time remaining until a reserve charge is depleted to a threshold and a predicted time remaining until the cache offload operation completes.

4. The storage system of claim 1, wherein selecting the subset of non-volatile memory devices to receive the cache data is further based on at least one time/charge profile stored in association with the selected subset of the non-volatile memory devices.

5. The storage system of claim 1, wherein the storage device controller is further configured to:
   power down a subset of the non-volatile memory devices excluding the selected subset; and
   offload the cache data to the selected subset of the non-volatile memory devices.

6. The storage system of claim 5, wherein the storage device controller is further configured to transmit a different subset of the cache data to each of non-volatile memory devices in the selected subset.

7. The storage system of claim 1, further comprising:
   a reserve power supply utilized to execute the cache offload operation.

8. A method comprising:
   detecting a power failure at a front-end device controller, the front end controller communicatively coupled to an array of non-volatile memory devices;
   responsive to detection of the power failure, selecting a subset of the non-volatile memory devices from the array to receive cache data from a volatile cache in a cache offload operation responsive to the detection of the power failure, the selection based on at least one predictive power parameter of each of the non-volatile memory devices in the selected subset; and
   offloading the cache data to the selected subset of the non-volatile memory devices.

9. The method of claim 8, further comprising:
   powering down a subset of the non-volatile memory devices excluding the selected subset prior to offloading the cache data to the selected subset.

10. The method of claim 8, wherein the at least one predictive power parameter includes bandwidth, current drawn, and size of data transferred by an individual cache offload command.

11. The method of claim 8, wherein the selection of the subset of the non-volatile memory devices is based on a comparison between a predicted time remaining until a reserve charge is depleted to a threshold and a predicted time remaining until the cache offload operation completes.

12. The method of claim 8, wherein selecting the subset of non-volatile memory devices to receive the cache data is further based on a time/charge profile stored in association with the selected subset of the non-volatile memory devices.

13. The method of claim 8, further comprising:
transmitting a different subset of the cache data to each of non-volatile memory devices in the selected subset.

14. One or more tangible computer-readable storage media encoding computer-executable instructions for executing on a computer system a computer process, the computer process comprising:
detecting a power failure at a front-end device controller, the front end controller communicatively coupled to an array of non-volatile memory devices;
responsive to detection of the power failure, selecting a subset of the non-volatile memory devices from the array to receive cache data from a volatile memory in a cache offload operation responsive to the detection of the power failure, the selection based on at least one predictive power parameter of each of the non-volatile memory devices in the selected subset; and
offloading the cache data to the selected subset of the non-volatile memory devices.

15. The one or more tangible computer-readable storage media of claim 14, wherein the computer process further comprises:
retrieving time/charge profiles associated with each of a number of different subsets of the non-volatile memory devices and selecting the subset based on the retrieved time/charge profiles.

16. The one or more tangible computer-readable storage media of claim 14, wherein the computer process further comprises:
powering down a subset of the non-volatile memory devices excluded from the selected subset prior to offloading the cache data to the selected subset.

17. The one or more tangible computer-readable storage media of claim 14, wherein the at least one predictive power parameter includes bandwidth and current drawn.

18. The one or more tangible computer-readable storage media of claim 14, wherein the selection of the subset of the non-volatile memory devices is based on a comparison between a predicted time remaining until a reserve charge is depleted to a threshold and a predicted time remaining until the cache offload operation completes.

19. The one or more tangible computer-readable storage media of claim 14, wherein selecting the subset of non-volatile memory devices to receive the cache data is further based on a time/charge profile stored in association with the selected subset of the non-volatile memory devices.

\* \* \* \* \*